United States Patent
Judson et al.

(10) Patent No.: US 9,318,801 B2
(45) Date of Patent: Apr. 19, 2016

(54) DUAL/WIDEBAND TERMINATION FOR HYBRID TRANSFORMER

(71) Applicant: QUALCOMM Incorporated, San Diego, CA (US)

(72) Inventors: Bruce Judson, San Diego, CA (US); Cong T Nguyen, San Diego, CA (US); Peter D Heidmann, San Diego, CA (US); Joseph Patrick Burke, Glenview, IL (US); Vladimir Aparin, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 315 days.

(21) Appl. No.: 13/828,954

(22) Filed: Mar. 14, 2013

(65) Prior Publication Data
US 2013/0335291 A1  Dec. 19, 2013

Related U.S. Application Data

(60) Provisional application No. 61/660,575, filed on Jun. 15, 2012.

(51) Int. Cl.
| H01Q 1/50 | (2006.01) |
| H01Q 9/16 | (2006.01) |
| H04B 1/18 | (2006.01) |
| H04B 1/04 | (2006.01) |
| H04B 1/525 | (2015.01) |
| H04B 1/58 | (2006.01) |

(52) U.S. Cl.
CPC . *H01Q 1/50* (2013.01); *H01Q 9/16* (2013.01); *H04B 1/0458* (2013.01); *H04B 1/18* (2013.01); *H04B 1/525* (2013.01); *H04B 1/581* (2013.01)

(58) Field of Classification Search
CPC ................................. H01Q 1/50; H01Q 9/16
USPC .................................. 343/850, 860, 861, 822
See application file for complete search history.

(56) References Cited

U.S. PATENT DOCUMENTS

| 3,781,684 | A | * | 12/1973 | Inslerman | ............... | H04B 1/48 |
| | | | | | | 455/11.1 |
| 4,051,475 | A | * | 9/1977 | Campbell | ............... | H04B 1/52 |
| | | | | | | 333/119 |
| 5,528,252 | A | * | 6/1996 | Skahill | ........................... | 343/822 |
| 7,596,356 | B2 | * | 9/2009 | Rofougaran et al. | ........... | 455/73 |
| 7,831,219 | B2 | | 11/2010 | Heuermann et al. | | |
| 8,208,865 | B2 | | 6/2012 | Mikhemar et al. | | |
| 8,208,866 | B2 | | 6/2012 | Mikhemar et al. | | |
| 2006/0160501 | A1 | * | 7/2006 | Mendolia et al. | ............. | 455/125 |

(Continued)

OTHER PUBLICATIONS

International Search Report and Written Opinion—PCT/US2013/044821, International Search Authority—European Patent Office, Sep. 30, 2013.

(Continued)

*Primary Examiner* — Hoang V Nguyen
(74) *Attorney, Agent, or Firm* — Liberty E. Mann

(57) ABSTRACT

A wireless device is described. The wireless device includes an antenna. The wireless device also includes a hybrid transformer. The wireless device further includes a frequency matching termination port. The frequency matching termination port provides impedance matching with the antenna at multiple frequencies. The frequency matching termination port may include multiple resistors, inductors and capacitors that can be switched in/out.

30 Claims, 10 Drawing Sheets

(56) References Cited

U.S. PATENT DOCUMENTS

2010/0164645 A1   7/2010  Kobayashi et al.
2011/0299431 A1  12/2011  Mikhemar et al.
2011/0299438 A1* 12/2011  Mikhemar et al. ............ 370/280
2012/0256702 A1* 10/2012  Khlat et al. .................. 333/133

OTHER PUBLICATIONS

Pursula, et al., "Hybrid Transformer-Based Adaptive RF Front End for UHF RFID Mobile Phone Readers," IEEE International Conference on RFID, 2008, pp. 150-155.

* cited by examiner

DUAL/WIDEBAND TERMINATION FOR HYBRID TRANSFORMER

RELATED APPLICATIONS

This application is related to and claims priority from U.S. Provisional Patent Application Ser. No. 61/660,575, filed Jun. 15, 2012, for "DUAL/WIDEBAND TERMINATION FOR HYBRID TRANSFORMER," which is incorporated herein by reference.

TECHNICAL FIELD

The present disclosure relates generally to wireless communication systems. More specifically, the present disclosure relates to systems and methods for dual/wideband termination for a hybrid transformer.

BACKGROUND

Wireless communication systems are widely deployed to provide various types of communication content such as voice, video, data and so on. These systems may be multiple-access systems capable of supporting simultaneous communication of multiple mobile devices with one or more base stations.

Reductions in both the size and cost of mobile devices and base stations may increase their marketability. Devices in wireless communication systems are increasingly configured to operate on multiple radio frequency (RF) bands utilizing multiple transmission technologies. However, a device that operates on multiple radio frequency (RF) bands has traditionally required a separate duplexer for each radio frequency (RF) band. These separate duplexers have design constraints that prevent them from being used in integrated circuits. Instead, discrete duplexers have been used, increasing both the cost and printed circuit board area.

One basic characteristic of a frequency division duplex (FDD) system is that the downlink and uplink operate simultaneously at different frequencies. For proper operation, isolation between the transmitter and the receiver is required. Duplexers typically provide this isolation but a hybrid transformer may also provide the isolation. In order for isolation to be obtained using a hybrid transformer, the termination load must match (or be a scaled replica of) the antenna impedance. This applies to all frequencies where isolation is required. Benefits may be obtained by using hybrid transformers in systems where the uplink and downlink operate in the same frequency.

SUMMARY

A wireless device is described. The wireless device includes an antenna. The wireless device also includes a hybrid transformer. The wireless device further includes a frequency matching termination port. The frequency matching termination port provides impedance matching with the antenna at multiple frequencies.

The frequency matching termination port may include multiple resistors, inductors and capacitors that can be switched in/out. The frequency matching termination port may mimic an impedance of the antenna over a broad range of frequencies. The wireless device may be a wireless communication device or a base station.

The frequency matching termination port may be controlled by a frequency impedance adjusting module. The frequency impedance adjusting module may continuously tune the frequency matching termination port to match the antenna impedance at the multiple frequencies. The frequency impedance adjusting module may also continuously tune the frequency matching termination port to match the antenna impedance at a single frequency for wideband termination in full duplex systems. The frequency impedance adjusting module may periodically tune the frequency matching termination port to match antenna impedance at the multiple frequencies. The frequency impedance adjusting module may also periodically tune the frequency matching termination port to match antenna impedance at a single frequency for wideband termination in full duplex systems.

The frequency impedance adjusting module may tune the frequency matching termination port to match an impedance of an approximated antenna trajectory at selected frequencies.

A method for impedance matching at multiple discrete matching frequencies is also described. Multiple discrete matching frequencies are determined for frequency matching. A frequency matching termination port is adjusted to obtain impedance matching with an antenna for a hybrid transformer at the multiple discrete matching frequencies.

The hybrid transformer and the antenna may be used for transmitting/receiving. Determining multiple discrete matching frequencies may include determining a number of discrete matching frequencies at which to match an impedance of the frequency matching termination port to an impedance of the antenna. Determining multiple discrete matching frequencies may also include selecting the discrete matching frequencies.

Adjusting a frequency matching termination port may include obtaining an approximated antenna trajectory for the antenna. Adjusting a frequency matching termination port may also include adjusting the frequency matching termination port to match an impedance of the approximated antenna trajectory at the selected discrete matching frequencies. The method may be performed by a base station or by a wireless communication device.

An apparatus for impedance matching at multiple discrete matching frequencies is also described. The apparatus includes means for determining multiple discrete matching frequencies for frequency matching. The apparatus also includes means for adjusting a frequency matching termination port to obtain impedance matching with an antenna for a hybrid transformer at the multiple discrete matching frequencies.

A computer-program product for impedance matching at multiple discrete matching frequencies is also described. The computer-program product includes a non-transitory computer-readable medium having instructions thereon. The instructions include code for causing a wireless device to determine multiple discrete matching frequencies for frequency matching. The instructions also include code for causing the wireless device to adjust a frequency matching termination port to obtain impedance matching with an antenna for a hybrid transformer at the multiple discrete matching frequencies.

DETAILED DESCRIPTION

A duplex communication system may include two interconnected transceivers that communicate with each other in both directions. There are two specific types of duplex communication systems: half duplex and full duplex. In half duplex communication systems, communication happens in one direction at a time. Thus, one transceiver may transmit and the other transceiver may receive at any given point in time. In full duplex communication systems, both transceivers can simultaneously transmit and receive.

Wireless and/or mobile communication systems are often full-duplex as specified by the standards that they employ. For example, a common full duplex mobile communication standard includes Universal Telecommunications System (UMTS) and Code Division Multiple Access (CDMA). In these full-duplex communication systems, the transmitter typically uses one carrier frequency in a given frequency band (e.g., 900 megahertz (MHz), 1800 MHz, 1900 MHz, 2100 MHz) and the receiver uses a different carrier frequency in the same frequency band. This scheme, where the transmitter and receiver operate over different frequencies, is referred to as frequency division duplexing (FDD).

Despite using different frequencies, the signal strength of the transmitted signal is significantly greater than that of the received signal at the transceiver. As such, the receiver is susceptible to interference from the transmitted signal and can be desensitized by the transmitted signal. In order to limit the interference, conventional transceivers include a duplexer, which utilizes frequency selectivity to provide typically 50 and 60 decibels (dB) of isolation between the transmitter and the receiver. However, to provide for high frequency communication standards, duplexers should be built with high quality factor (Q-factor) and low loss materials, which currently cannot be done using silicon-based technology. As such, conventional duplexers may be fabricated using special materials and processes (e.g., ceramic, surface acoustic wave (SAW), film bulk acoustic wave resonator (FBAR)) that cannot be integrated with a transceiver on a silicon-based integrated circuit.

Figure 1:
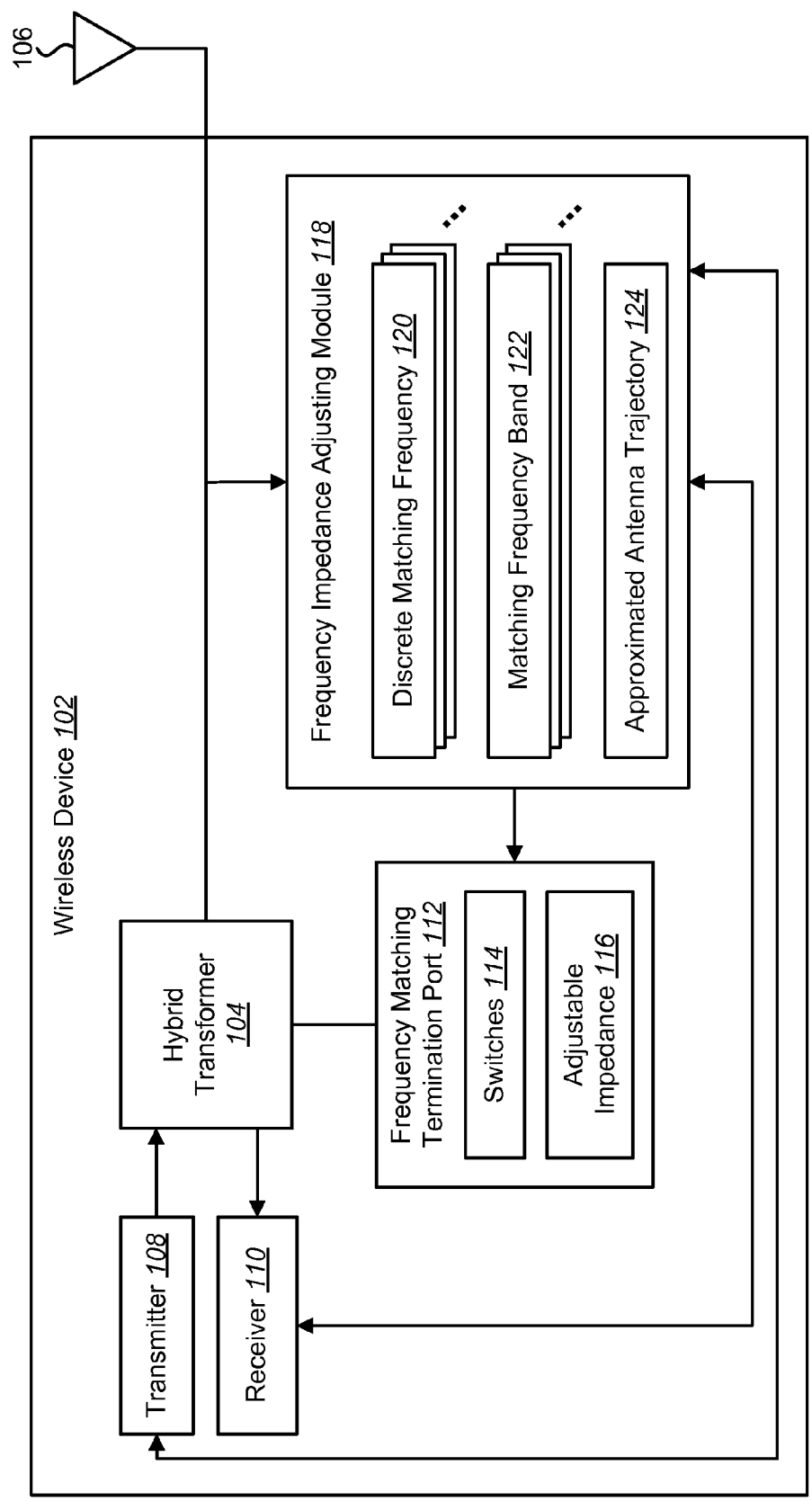
FIG. 1 is a block diagram of a wireless device for use in the present systems and methods.

FIG. 1 is a block diagram of a wireless device 102 for use in the present systems and methods. The wireless device 102 may include a hybrid transformer 104 that provides isolation between transmit signals and receive signals. The transmit signals and the receive signals may use a single antenna 106 or separate antennas (not shown). As a condition of isolation, the termination impedance must be equal to or a scaled equivalent of the impedance of the antenna 106. A balancing impedance may be used to match the termination impedance of the wireless device 102 (that includes the hybrid transformer 104) to the impedance of the antenna 106. It may be beneficial for the balancing impedance to match the impedance of the antenna 106 at more than a single frequency. For example, the frequency matching termination port 112 may provide a balancing impedance that matches the impedance of the antenna 106 at multiple frequencies or multiple frequency bands.

The wireless device 102 may operate in a communication system with multiple other wireless devices 102. Wireless communication systems are widely deployed to provide various types of communication content such as voice, data and so on. A wireless device 102 may be a base station or a wireless communication device.

A base station is a station that communicates with one or more wireless communication devices. A base station may also be referred to as, and may include some or all of the functionality of, an access point, a broadcast transmitter, a NodeB, an evolved NodeB, etc. The term "base station" will be used herein. Each base station provides communication coverage for a particular geographic area. A base station may provide communication coverage for one or more wireless communication devices. The term "cell" can refer to a base station and/or its coverage area depending on the context in which the term is used.

A wireless communication device may also be referred to as, and may include some or all of the functionality of, a terminal, an access terminal, a user equipment (UE), a subscriber unit, a station, etc. A wireless communication device may be a cellular phone, a personal digital assistant (PDA), a wireless device, a wireless modem, a handheld device, a laptop computer, etc. A wireless communication device may communicate with zero, one or multiple base stations on the downlink and/or uplink at any given moment. The downlink (or forward link) refers to the communication link from a base station to a wireless communication device, and the uplink (or reverse link) refers to the communication link from a wireless communication device to a base station.

Communications in a wireless system (e.g., a multiple-access system) may be achieved through transmissions over a wireless link. Such a communication link may be established via a single-input and single-output (SISO), a multiple-input and single-output (MISO) or a multiple-input and multiple-output (MIMO) system. A MIMO system includes transmitter(s) and receiver(s) equipped, respectively, with multiple ($N_T$) transmit antennas and multiple ($N_R$) receive antennas for data transmission. SISO and MISO systems are particular instances of a MIMO system. The MIMO system can provide improved performance (e.g., higher throughput, greater capacity or improved reliability) if the additional dimensionalities created by the multiple transmit and receive antennas are utilized.

A wireless device 102 may be capable of operating on multiple radio frequency (RF) bands (referred to as multi-band). A wireless device 102 may also be capable of utilizing multiple radio technologies, such as those discussed above (referred to as multi-mode). Typically, a wireless device 102 that is both multi-band and multi-mode may include discrete duplexers, power amplifiers (PAs) and dedicated low noise amplifier (LNA) inputs for each radio frequency (RF) band and sometimes for each radio technology. The duplexers may refer to an RF front end that uses multiple filters to separate/isolate the uplink and the downlink.

As the number of radio frequency (RF) bands and radio technologies used by a single wireless device 102 increases, the size, cost and complexity of the wireless device 102 also increases. The one or more duplexers may occupy a significant portion of printed circuit board (PCB) area. An alternative implementation of a duplexer may be based on the electrical balance of a hybrid transformer 104, rather than the frequency selectivity.

The wireless device 102 may include a transmitter 108 and a receiver 110. The transmitter 108 and the receiver 110 may be connected to the antenna 106 via the hybrid transformer 104. The hybrid transformer 104 may thus allow both the transmitter 108 and the receiver 110 to communicate simultaneously using a single antenna 106. The hybrid transformer 104 may be designed to provide sufficient isolation between transmit signals and receive signals. The isolation may be conditional on the impedance at the antenna port (i.e., the observed impedance of the antenna 106 from the perspective of the hybrid transformer 104) and the termination port (i.e., the frequency matching termination port 112) to be matched. If isolation is required at more than one frequency or over a range of frequencies, the antenna port and the termination port must have impedance matching at each of the frequencies of interest. Common industry practice is to match the antenna impedance at a single frequency (typically at the Tx frequency) using components within the termination port. This may result in low isolation at the Rx frequency, typically resulting in power amplifier (PA) Rx band noise that desensitizes the receiver 110.

The impedance of the antenna 106 may change with frequency. Thus, different transmit frequencies and different receive frequencies may affect the impedance of the antenna 106. The antenna 106 may provide a rough match of impedance at the input port. For example, the antenna 106 match may be better than a 3:1 voltage standing wave ratio (VSWR). This means that the antenna 106 input impedance can be anywhere on or inside the VSWR=3 circle (shown in FIG. 7) (at both the transmit frequency and the receive frequency). FIG. 8 below shows one example of an impedance trajectory where the impedance changes versus frequency.

In order to achieve isolation between the transmitter 108 and the receiver 110, the matching termination must be equal to or a scaled replica of the antenna 106 impedance at the frequencies of interest (i.e., the Tx frequency and the Rx frequency). The amount of isolation achieved may be a function of how well the matching termination (i.e., the observed impedance of the hybrid transformer 104 and the frequency matching termination port 112) and the antenna 106 impedance match. Typically, the antenna 106 impedance must match the matching termination on the order of <<1%.

The frequency matching termination port 112 may provide impedance matching for the hybrid transformer 104 at multiple frequencies or multiple frequency bands. For example, the frequency matching termination port 112 may provide impedance matching for the hybrid transformer 104 at three discrete frequencies. As another example, the frequency matching termination port 112 may provide impedance matching for the hybrid transformer 104 over two frequency bands.

The frequency matching termination port 112 may be controlled by a frequency impedance adjusting module 118. The frequency impedance adjusting module 118 may allow the frequency matching termination port 112 to dynamically adjust impedance values to match those of the antenna 106 at the transmit/receive frequencies. The frequency impedance adjusting module 118 may also allow the frequency matching termination port 112 to dynamically adjust impedance values to match the response of the antenna 106 to varying transmit and receive frequencies. For example, the frequency impedance adjusting module 118 may adjust switches 114 within the frequency matching termination port 112 to adjust the resistivity and reactance of the frequency matching termination port 112 (i.e., by tuning an adjustable impedance 116) to match the impedance of the antenna 106 for different frequencies. Analog devices, such as variable capacitors, varactors (using semiconductor, microelectromechanical system (MEMS) or ferro-electric capacitors) and variable inductors (such as those that utilize ferro-magnetic devices or variable microelectromechanical (MEMS) inductors) may be used to implement the frequency matching termination port 112.

The frequency impedance adjusting module 118 may be connected to the hybrid transformer 104 and the antenna 106. The frequency impedance adjusting module 118 may also be connected to the receiver 110 (e.g., via the interconnect between the receiver 110 and the hybrid transformer 104) and the transmitter (e.g., via the interconnect between the transmitter 108 and the hybrid transformer 104). In one configuration, the frequency impedance adjusting module 118 may use test tones to simultaneously test multiple frequencies (i.e., discrete matching frequencies 120) through the antenna 106. The test tones may be sequenced to the individual frequencies or the test tones may be simultaneous. In one configuration, the transmitter 108 may generate the test tones. Other sources within the wireless device 102 may also be used to generate the test tones.

The frequency impedance adjusting module 118 may then tune the adjustable impedance 116 of the frequency matching termination port 112 to obtain optimized impedance matching for the designated frequencies. Different systems may allow for different adjustment methodologies. In one example, the frequency impedance adjusting module 118 may apply four tones at four frequencies to the antenna 106. The frequency impedance adjusting module 118 may measure the impedance of the antenna 106 at each of the frequencies and use the switches 114 to tune to adjustable impedance 116 in the frequency matching termination port 112 to most closely match the impedance of the antenna 106 at each of the four frequencies.

In another configuration, the frequency impedance adjusting module 118 may use test tones to simultaneously test multiple frequency bands (i.e., matching frequency bands 122) through the antenna 106. Rather than using test tones, the frequency impedance adjusting module 118 may use existing signals to tune the adjustable impedance 116 of the frequency matching termination port 112 in real time.

Although the hybrid transformer 104 can be broadband, the impedance of the antenna 106 is highly reactive within the radiation bands. A single frequency match is typically narrow. The impedance (resistivity and reactance) of the antenna 106 changes according to the transmit/receive frequencies, the antenna 106 design, the printed wiring board (PWB) or printed circuit board (PCB) layout and mechanics, the proximity loads (including distance and load characteristics), the electrical delay between the hybrid transformer 104 and the antenna 106 (impedance rotation) and the devices between the antenna 106 and the hybrid transformer 104 (e.g., filters). Thus, an adaptive solution to provide impedance matching at multiple frequencies is needed.

The wireless device 102 may include an approximated antenna trajectory 124 for the antenna 106. The approximated antenna trajectory 124 may be based on models for the antenna 106 obtained from testing. In one configuration, the approximated antenna trajectory 124 may be programmed on the wireless device 102. In another configuration, the wireless device 102 may continuously (or periodically) monitor the impedance of the antenna 106 and generate an approximated antenna trajectory 124 that maps the impedance of the antenna 106 to frequency.

Figure 2:
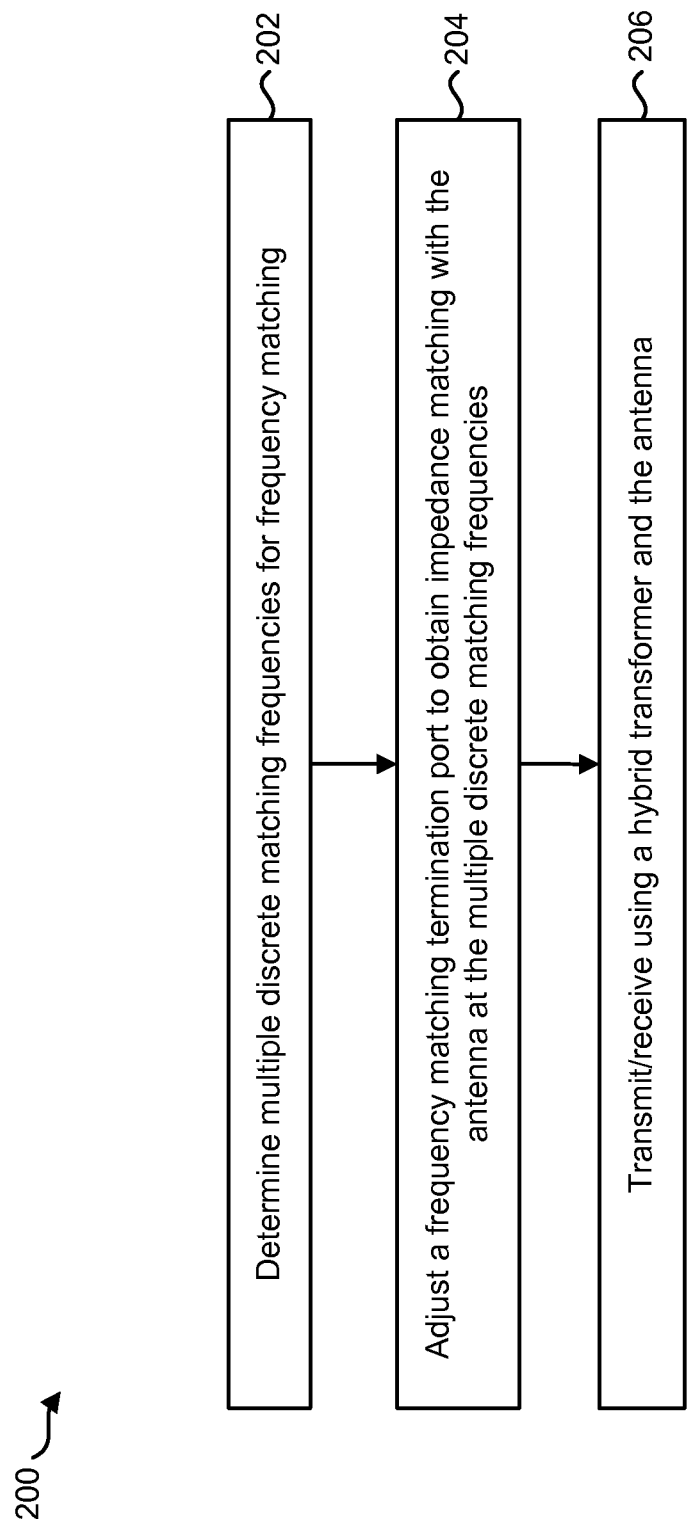
FIG. 2 is a flow diagram of a method for providing impedance matching at multiple frequencies.

FIG. 2 is a flow diagram of a method 200 for providing impedance matching at multiple discrete matching frequencies 120. The method 200 may be performed by a wireless device 102 such as a wireless communication device or a base station. In one configuration, the method 200 may be performed by a frequency impedance adjusting module 118 within the wireless device 102. The wireless device 102 may include a hybrid transformer 104 and a frequency matching termination port 112.

The wireless device 102 may determine 202 multiple discrete matching frequencies 120 for frequency matching. For example, the wireless device 102 may determine those frequencies 120 at which impedance matching is most desired or most feasible (e.g., at the transmit frequency and the receive frequency). In one configuration, the wireless device 102 may select multiple random frequencies within a set frequency spectrum as the multiple discrete matching frequencies 120. In another configuration, the network may determine the frequencies of operation. The wireless device 102 may determine the multiple discrete matching frequencies 120 by receiving these frequencies 120 from the network. The wireless device 102 may also determine one or more matching frequency bands 122 to be used for frequency matching.

The wireless device 102 may adjust 204 a frequency matching termination port 112 to obtain impedance matching with the antenna 106 at the multiple frequencies. Adjusting 204 the frequency matching termination port 112 may include adjusting switches 114 within the frequency matching termination port 112 to increase or decrease the resistivity of the frequency matching termination port 112. Adjusting 204 the frequency matching termination port 112 may also include adjusting switches 114 within the frequency matching termination port 112 to increase/decrease the reactance of the frequency matching termination port 112. This may include switching inductors and/or capacitors in the frequency matching termination port 112 in or out. Instead of using discrete switches 114, analog devices and/or delay elements may be used to increase or decrease the resistivity and/or reactance of the frequency matching termination port 112.

The wireless device 102 may then transmit/receive 206 using a hybrid transformer 104 and the antenna 106. By adjusting 204 the frequency matching termination port 112 to provide impedance matching at multiple discrete matching frequencies 120 or matching frequency bands 122, significant isolation between the transmit frequency and the receive frequency may be obtained.

Figure 3:
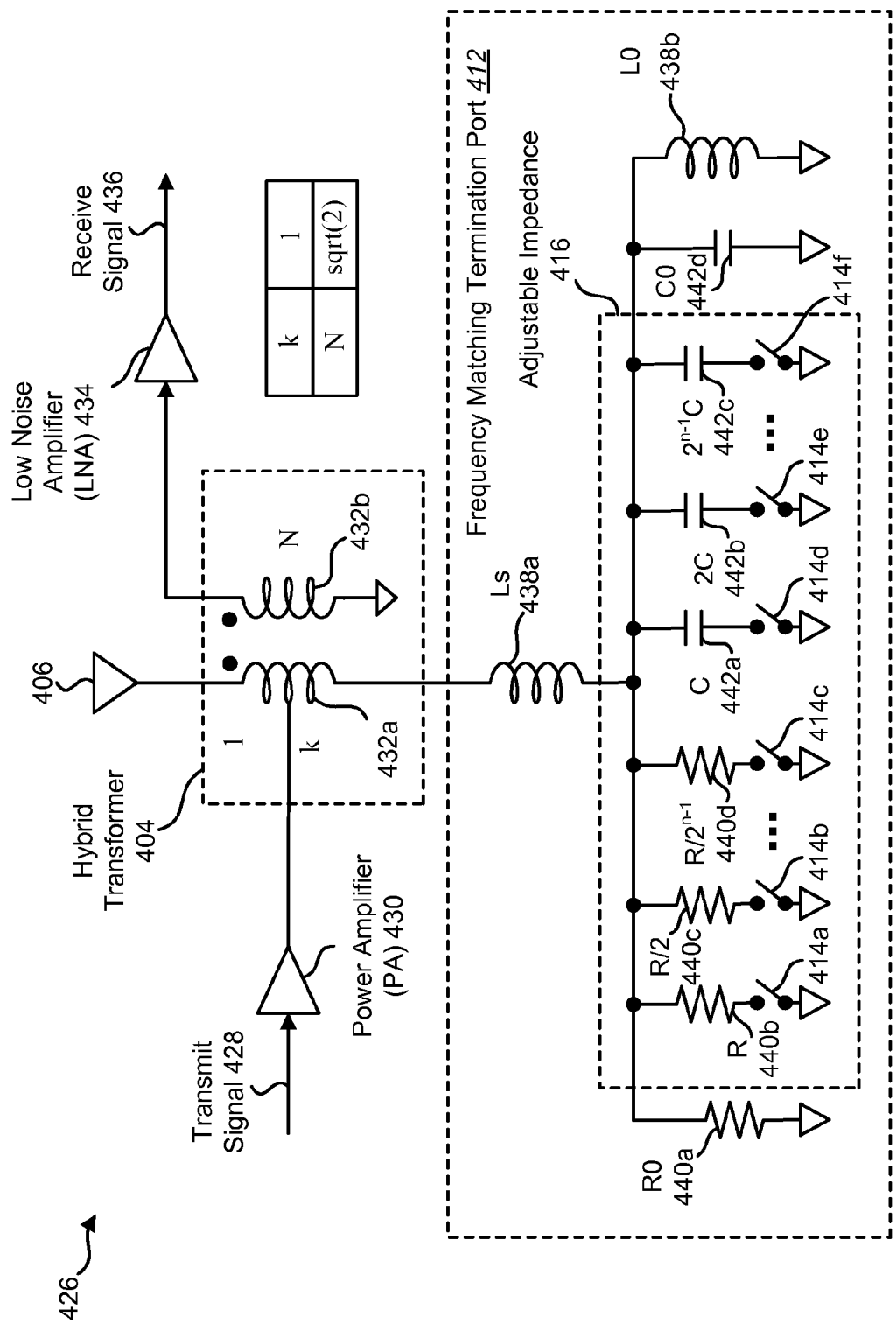
FIG. 3 is a circuit diagram illustrating one configuration of frequency matching termination port.

FIG. 3 is a circuit diagram illustrating another RF front end 426 that includes a hybrid transformer 404 and a frequency matching termination port 412. The frequency matching termination port 412 of FIG. 3 may be one configuration of the frequency matching termination port 112 of FIG. 1. The frequency matching termination port 412 may include an adjustable impedance 416 and switches 414a-f.

The frequency matching termination port 412 may be connected between ground and the hybrid transformer 404. For example, the frequency matching termination port 412 may be connected to the primary coil 432a of the hybrid transformer 404. The term "coil" may refer to a discrete inductor or to a coil as part of a transformer. The primary coil 432a may also be connected to the antenna 406 and to a power amplifier (PA) 430. The input of the power amplifier (PA) 430 may receive a transmit signal 428. The secondary coil 432b of the hybrid transformer 404 may be connected between ground and an input of a low noise amplifier (LNA) 434. The low noise amplifier (LNA) 434 may output a receive signal 436.

The frequency matching termination port 412 illustrated is primarily inductive. Thus, a first inductor Ls 438a is connected between the primary coil 432a and the adjustable impedance 416. The switches 414a are designed to adjust the resistance and increase/decrease the capacitive reactance. A first resistor R0 440a is connected between the first inductor Ls 438a and ground. Additional resistors R 440b, R/2 440c through to $$\frac{R}{2^{n-1}}$$

440d are also connected to the first inductor Ls 438a and to ground via switches 414a-c. Thus, by adjusting the switches 414a-c, the resistance of the adjustable impedance 416 may be increased/decreased.

Multiple capacitors C 442a, 2C 442b through to $2^{n-1}$C 442c are also connected to the first inductor Ls 438a and to ground via switches 414d-f. By adjusting the switches 414d-f, the capacitive reactance of the frequency matching termination port 412 may be increased/decreased. A capacitor C0 442d may also be connected between the first inductor Ls 438a and ground. An inductor L0 438b may further be connected between the first inductor Ls 438a and ground. The resistor R0 440a, capacitor C0 442d and inductor L0 438b may provide initial resistance and reactance values for the frequency matching termination port 412. The sizes of the resistors 440 and capacitors 442 may be selected to allow for impedance matching. The frequency matching termination port 412 shown is primarily inductive (and thus the reactance is adjusted only by adding/removing capacitors 442 from the circuit). A frequency matching termination port 412 that is capacitive (only inductors 438 are added/removed from the circuit to adjust reactance) or a frequency matching termination port 412 where both capacitors 442 and inductors 438 may be added/removed to adjust reactance may also be used.

Figure 4:
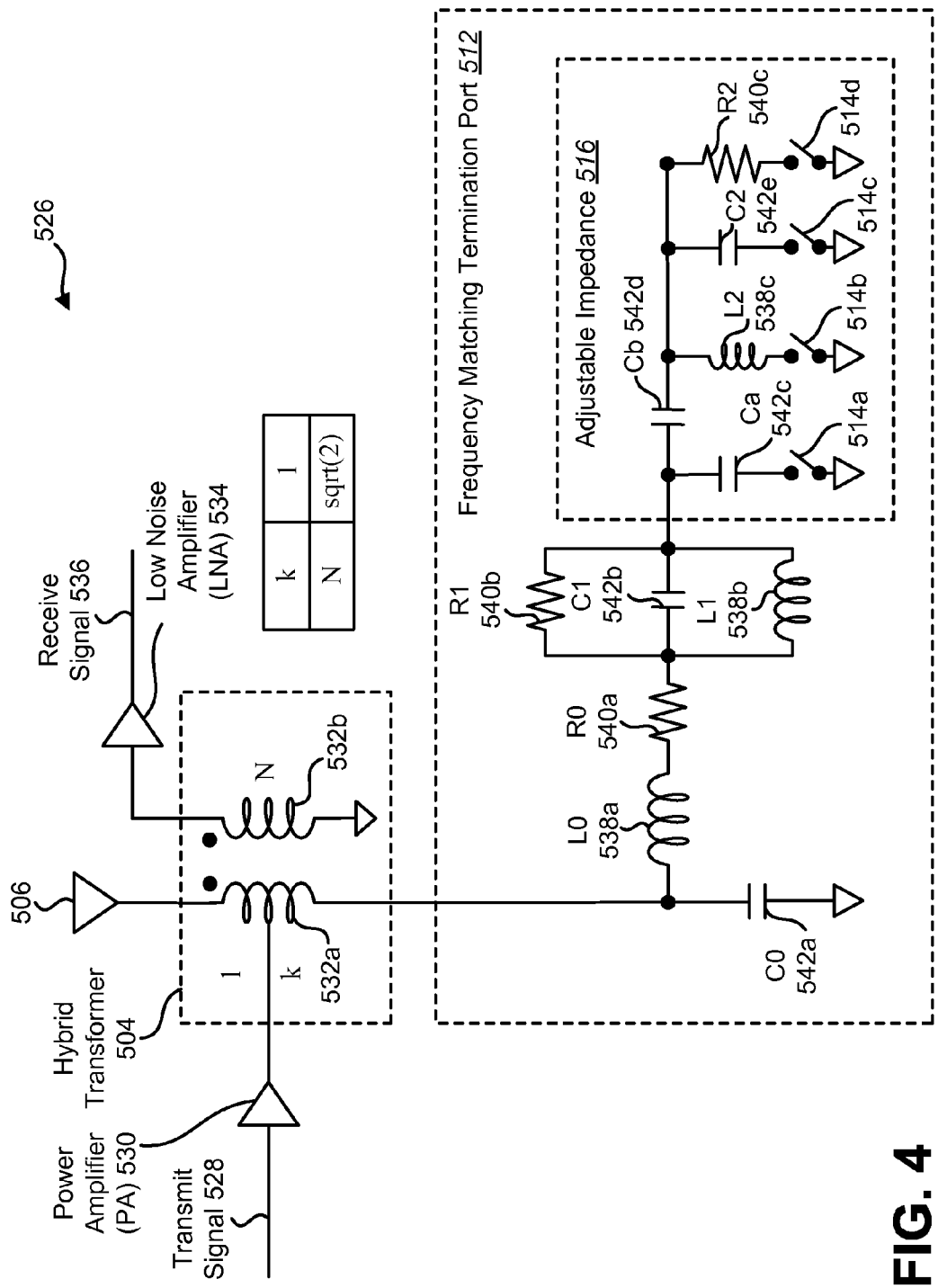
FIG. 4 is a circuit diagram illustrating yet another RF front end that includes a hybrid transformer and a frequency matching termination port.

FIG. 4 is a circuit diagram illustrating yet another RF front end 526 that includes a hybrid transformer 504 and a frequency matching termination port 512. The frequency matching termination port 512 of FIG. 4 may be one configuration of the frequency matching termination port 112 of FIG. 1. The frequency matching termination port 512 may include an adjustable impedance 516 and switches 514a-d.

The frequency matching termination port 512 may be connected between ground and the hybrid transformer 504. For example, the frequency matching termination port 512 may be connected to the primary coil 532a of the hybrid transformer 504. The primary coil 532a may also be connected to the antenna 506 and to a power amplifier (PA) 530. The input of the power amplifier (PA) 530 may receive a transmit signal 528. The secondary coil 532b of the hybrid transformer 504 may be connected between ground and an input of a low noise amplifier (LNA) 534. The low noise amplifier (LNA) 534 may output a receive signal 536.

The frequency matching termination port 512 may include multiple capacitors 542a-e, inductors 538a-c, resistors 540a-c and switches 514a-d. The switches 514 and some of the inductors 538, capacitors 542 and resistors 540 may be part of an adjustable impedance 516. A capacitor C0 542a may be connected between the primary coil 532a and ground. An inductor L0 538a may be connected between the primary coil 532a and a resistor R0 540a. The resistor R0 540a may be connected between the inductor L0 538a and a parallel combination of a resistor R1 540b, a capacitor C1 542b and an inductor L1 538b.

The parallel combination of the resistor R1 540b, the capacitor C1 542b and the inductor L1 538b may be connected to a capacitor Ca 542c and a capacitor Cb 542d. The capacitor Ca 542c may be connected to ground via a switch 514a. The capacitor Cb 542d may be connected to an inductor L2 538c. The inductor L2 538c may be connected to ground via a switch 514b. The capacitor Cb 542d may also be connected to a capacitor C2 542e. The capacitor C2 542e may be connected to ground via a switch 514c. The capacitor Cb 542d may further be connected to a resistor R2 540c. The resistor R2 540c may be connected to ground via a switch 514d. The capacitor Ca 542c, the capacitor Cb 542d, the inductor L2 538c, the capacitor C2 542e and the resistor 540c may form the adjustable impedance 516. The switches 514 may adjust the resistance and reactance of the frequency matching termination port 512.

FDD bands are paired, meaning one band includes one uplink sub-band and one downlink sub-band, referred to as a single band. The hybrid transformer 504 may use a broadband balancing impedance that uses resonators to match the resonances in the antenna 506. In one configuration, the hybrid transformer 504 and the frequency matching termination port 512 may be used in a single frequency full duplex (SFFD) application. Over a wide enough bandwidth, a lumped element termination or balancing circuit that mimics the resonators within the antenna 506 may be used. A dual band SFFD could also be used. For example, SFFD may be performed in both the 2.4 GHz and the 5 GHz bands.

For advanced programmable logic controllers (PLC), the wideband termination port may be applied. The broadband balancing impedance may use resonators to match the resonances in the impedance of a powerline or other wireline interface.

Figure 5:
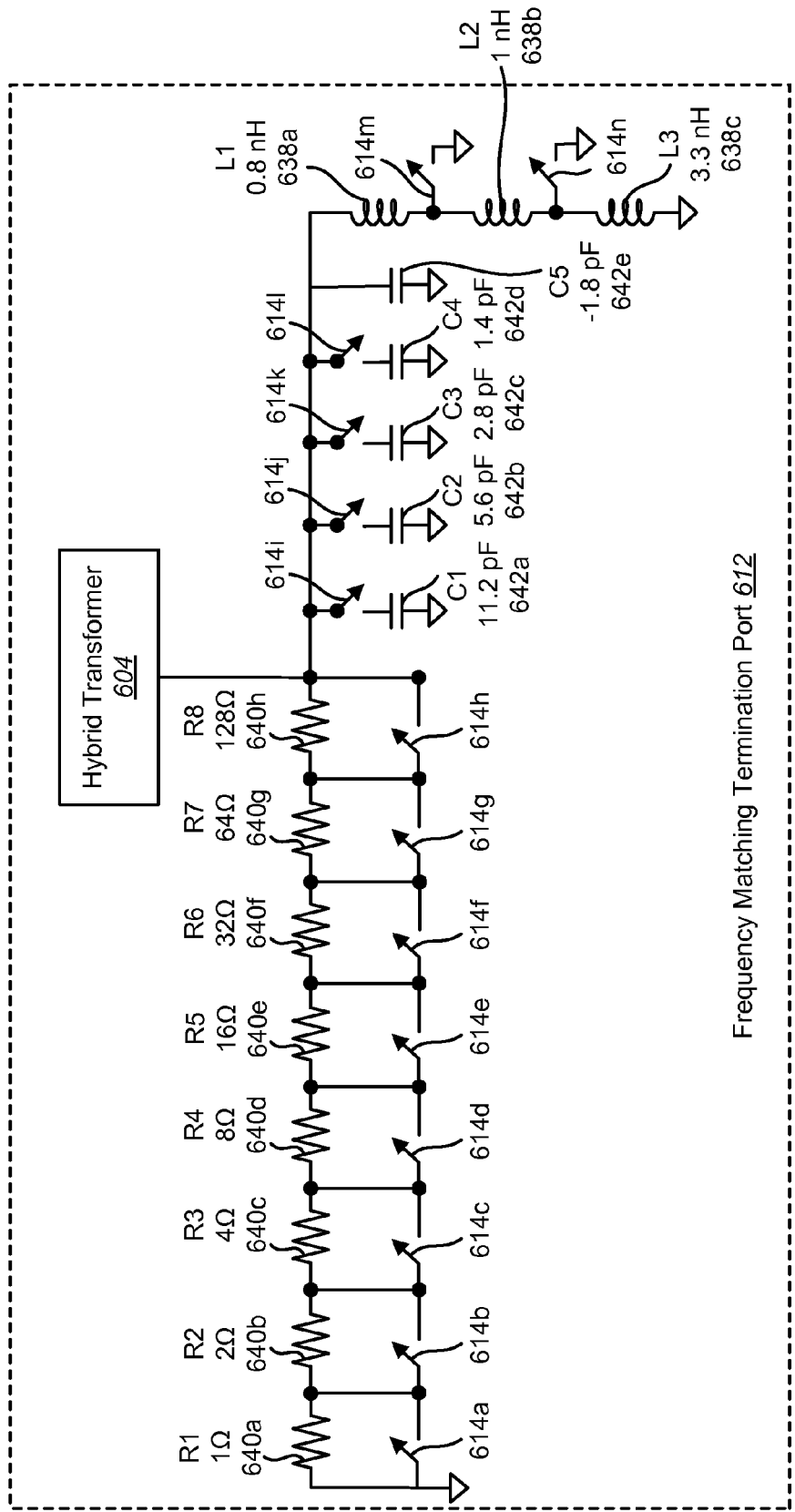
FIG. 5 is a circuit diagram illustrating a frequency matching termination port connected to a hybrid transformer.

FIG. 5 is a circuit diagram illustrating a frequency matching termination port 612 connected to a hybrid transformer 604. The frequency matching termination port 612 of FIG. 5 may be one configuration of the frequency matching termination port 112 of FIG. 1. All of the circuit components in the frequency matching termination port 612 may be part of an adjustable impedance 116.

The frequency matching termination port 612 may include multiple resistors 640a-h of varying sizes. The resistors 640 may be connected in series between the hybrid transformer 604 and ground. The resistor R1 640a may be 1 ohm, R2 640b may be 2 ohms, R3 640c may be 4 ohms, R4 640d may be 8 ohms, R5 640e may be 16 ohms, R6 640f may be 32 ohms, R7 640g may be 64 ohms and R8 640h may be 128 ohms. The resistor R1 640a may be connected between ground and the resistor R2 640b. The resistor R8 640h may be connected between the hybrid transformer 604 and the resistor R7 640g. Each of the resistors may be connected in parallel to a switch 614a-h. For example, the resistor R1 may be connected in parallel to a switch 614a and the resistor R2 may be connected in parallel to a switch 614b. Each of the switches 614 a-h may be connected in series between ground and the hybrid transformer 604.

The frequency matching termination port 612 may also include multiple capacitors 642a-e. The capacitor C1 642a may be connected between ground and a switch 614i. The switch 614i may be connected between the capacitor C1 642a and the hybrid transformer 604. The capacitor C2 642b may be connected between ground and a switch 614j. The switch 614j may be connected between the capacitor C2 642c and the hybrid transformer 604. The capacitor C3 642c may be connected between ground and a switch 614k. The switch 614k may be connected between the capacitor C3 642c and the hybrid transformer 604. The capacitor C4 642d may be connected between ground and a switch 614l. The switch 614l may be connected between the capacitor C4 642d and the hybrid transformer 604. The capacitor C5 642e may be connected between the hybrid transformer 604 and ground.

The capacitor C1 642a may be 11.2 picofarads (pF). The capacitor C2 642b may be 5.6 pF. The capacitor C3 642c may be 2.8 pF. The capacitor C4 642d may be 1.4 pF. The capacitor C5 642e may be −1.8 pF.

An inductor L1 638a may be connected between the hybrid transformer 604 and an inductor L2 638b. A switch 614m may toggle the inductor L1 638a from being connected to ground. A switch 614n may toggle the inductor L2 638b from being connected to ground. The inductor L2 638b may be connected between the inductor L1 638a and an inductor L3 638c. The inductor L3 638b may also be connected to ground. The inductor L1 638a may be 0.8 nanohenry (nH). The inductor L2 638b may be 1 nH. The inductor L3 638c may be 3.3 nH. Adjusting the switches 614 may adjust the reactance and/or resistance of the frequency matching termination port 612.

Figure 6:
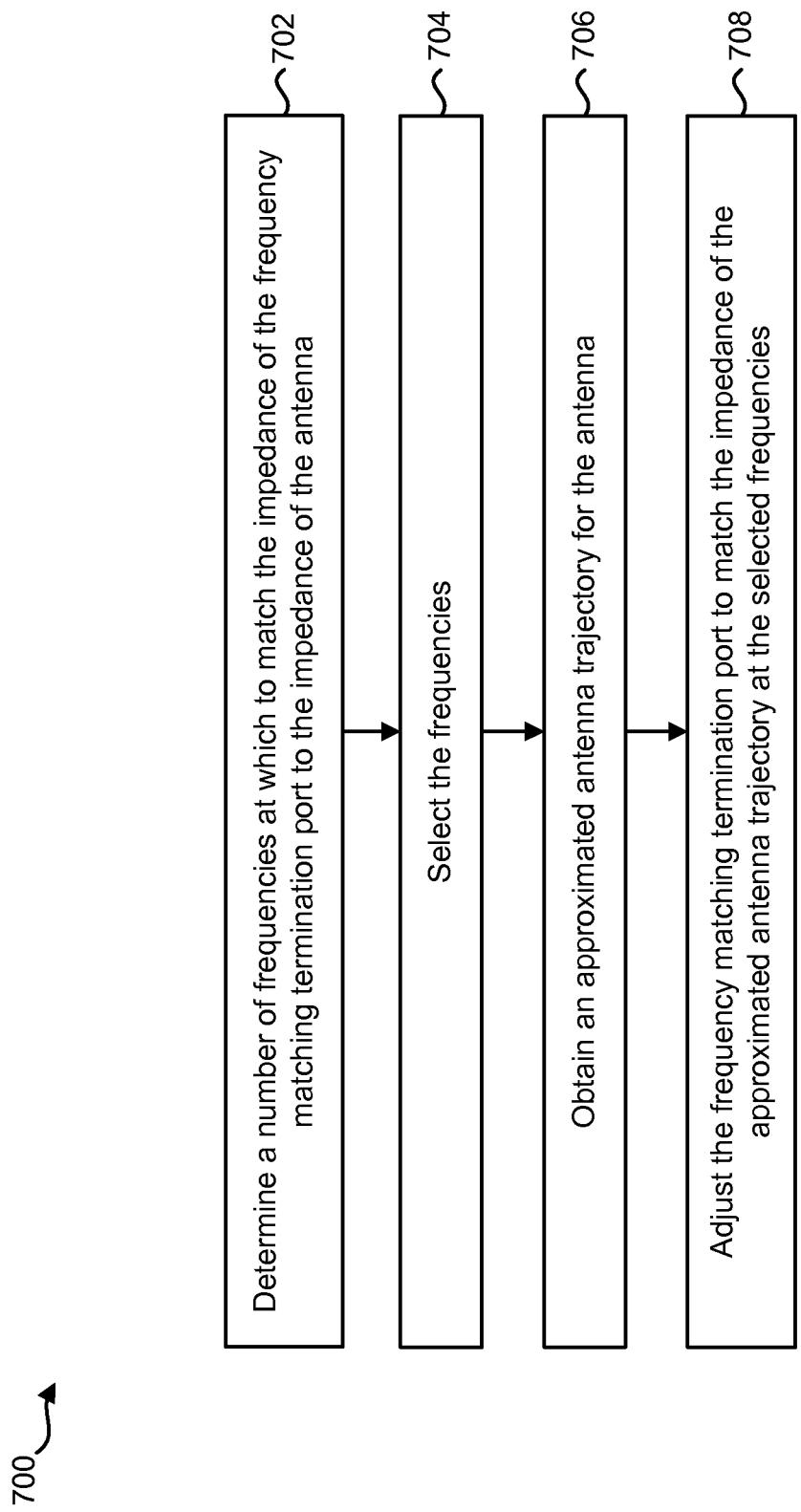
FIG. 6 is a flow diagram of a method for using an approximated antenna trajectory to tune a frequency matching termination port.

FIG. 6 is a flow diagram of a method 700 for using an approximated antenna trajectory 124 to tune a frequency matching termination port 112. The method 700 may be performed by a wireless device 102. In one configuration, the method 700 may be performed by a frequency impedance adjusting module 118 on the wireless device 102.

The wireless device may determine 702 a number of frequencies at which to match the impedance of the frequency matching termination port 112 to the impedance of the antenna 106. For example, the wireless device 702 may determine that only two frequencies are to be matched (e.g., the transmit frequency and the receive frequency). As another example, the wireless device 102 may determine that two frequency bands are to be matched.

The wireless device 102 may select 704 the frequencies to be matched. As discussed above, the frequencies may be discrete matching frequencies 120 or matching frequency bands 122. The wireless device 102 may obtain 706 an approximated antenna trajectory 124 for the antenna 106. The approximated antenna trajectory 124 may be based on models for the antenna 106 obtained from testing. In one configuration, the approximated antenna trajectory 124 may be programmed on the wireless device 102. In another configuration, the wireless device 102 may continuously (or periodically) monitor the impedance of the antenna 106 and generate an approximated antenna trajectory 124 that maps the impedance of the antenna 106 to frequency. An example of an approximated antenna trajectory 124 is illustrated in FIG. 8.

The wireless device 102 may adjust 708 the frequency matching termination port 112 to match the impedance of the approximated antenna trajectory 124 at the selected frequencies. For example, the wireless device 102 may adjust switches 114 to tune the adjustable impedance 116 to match the impedance of the antenna 106 predicted by the approximated antenna trajectory 124.

Figure 7:
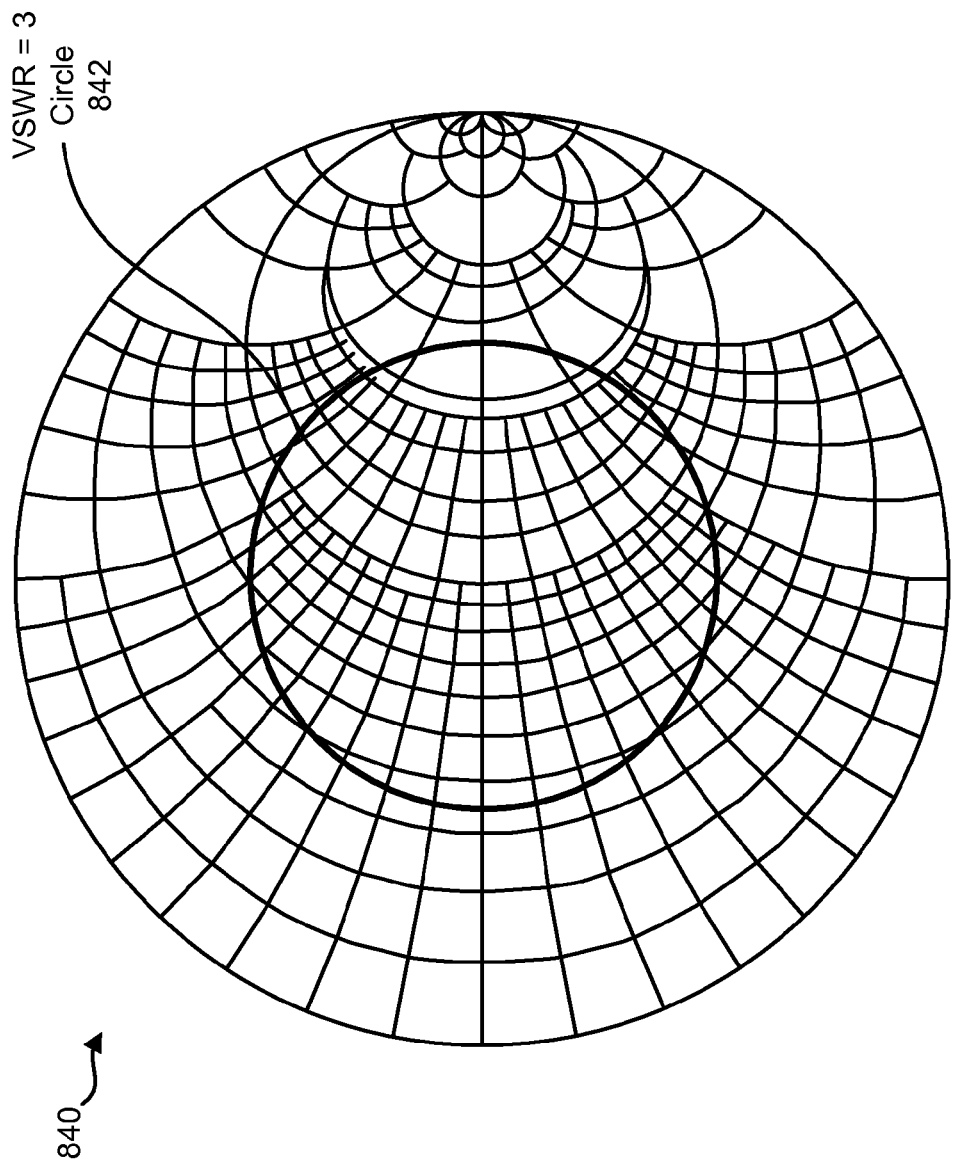
FIG. 7 illustrates a Smith chart that may be used in the present systems and methods.
Figure 8:
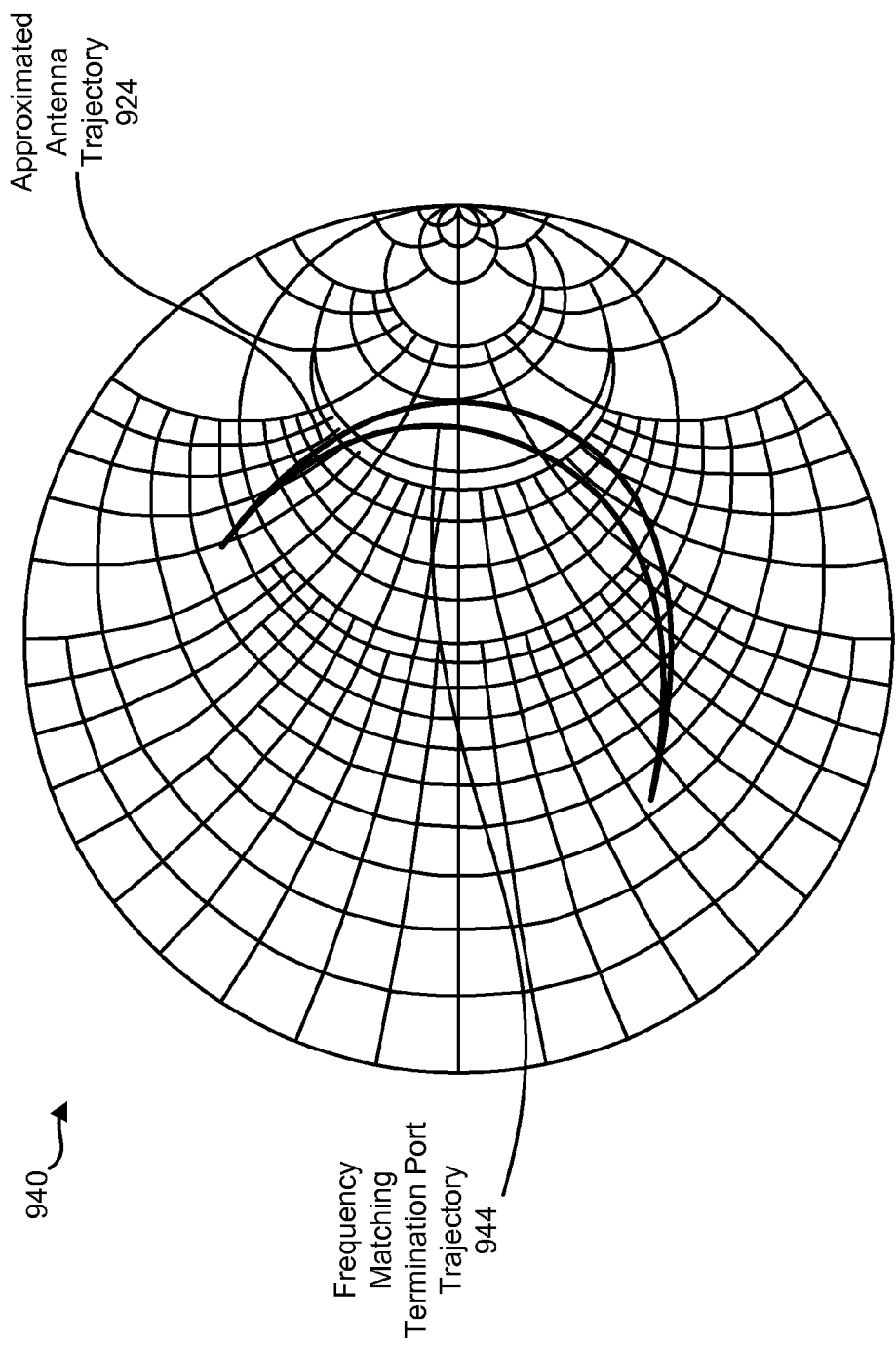
FIG. 8 illustrates a Smith chart that includes an approximated antenna trajectory.

FIG. 7 illustrates a Smith chart 840 that may be used in the present systems and methods. The Smith chart 840 may represent the impedance matching in a frequency matching termination port 112 to match the impedance of an antenna 106 at multiple frequencies. The Smith chart 840 includes a voltage standing wave ratio (VSWR)=3 circle 842. The voltage standing wave ratio (SVWR) is a function of the reflection coefficient, which describes the power reflected from the antenna 106. A VSWR of 3 or below is considered acceptable for wireless communications. In general, a VSWR of 1 means that the antenna 106 is matched to the characteristic impedance of the wireless device 102, which is typically 50 ohms.

If a hybrid transformer 104 with a turn ratio of 1:1 is used, then the impedance at the antenna 106 may be required to equal the impedance at the termination port to achieve isolation. Other turn ratios can be used, which would result in the impedance at the termination port being a scaled version of the impedance at the antenna 106 to achieve isolation.

FIG. 8 illustrates a Smith chart 940 that includes an approximated antenna trajectory 924. As discussed above, the approximated antenna trajectory 924 may be obtained using models of an antenna 106, by continuous testing by the wireless device 102 or by periodic testing by the wireless device 102. A frequency matching termination port trajectory 944 is also shown. The frequency matching termination port trajectory 944 is the impedance trajectory of the frequency matching termination port 112 for multiple frequencies. The frequency matching termination port trajectory 944 may be adjusted to closely match the approximated antenna trajectory 924 at multiple frequencies or multiple frequency bands.

Figure 9:
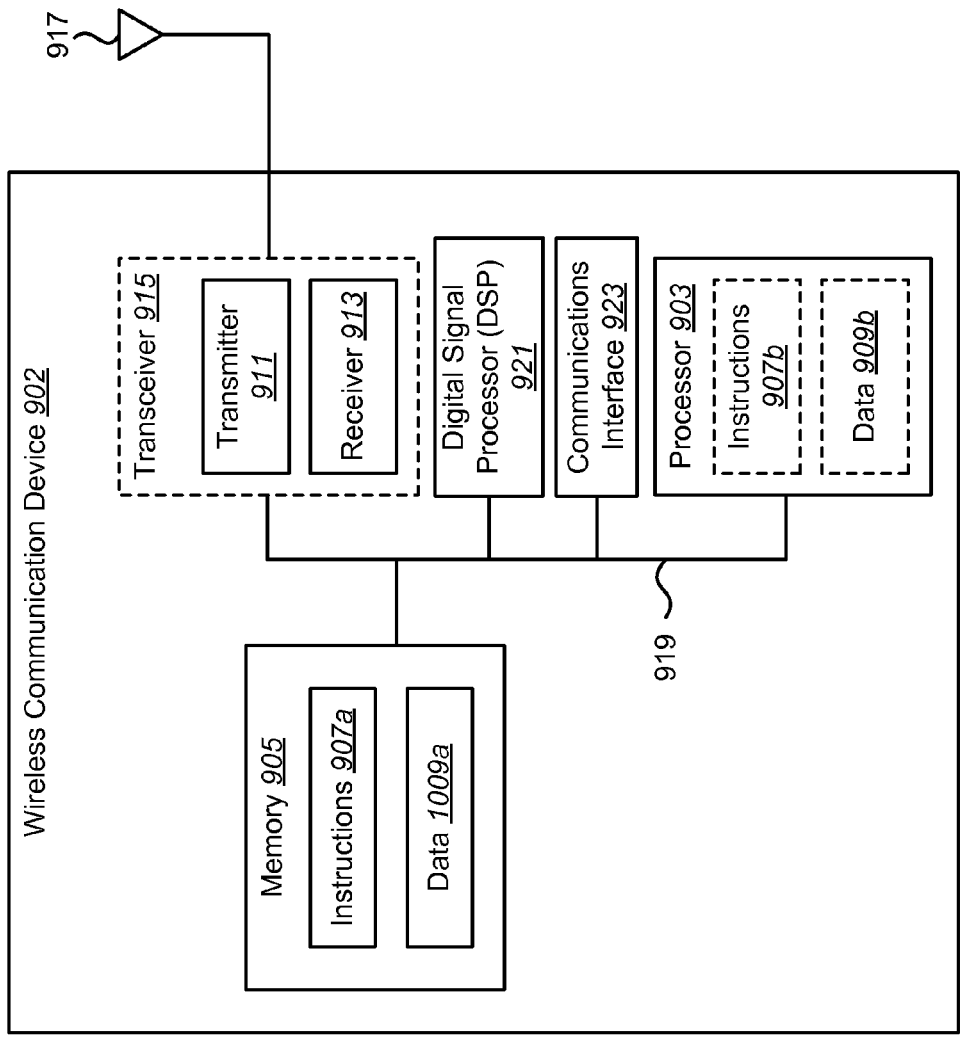
FIG. 9 illustrates certain components that may be included within a wireless communication device.

FIG. 9 illustrates certain components that may be included within a wireless communication device 902. The wireless communication device 902 may be an access terminal, a mobile station, a user equipment (UE), etc. The wireless communication device 902 includes a processor 903. The processor 903 may be a general purpose single- or multi-chip microprocessor (e.g., an ARM), a special purpose microprocessor (e.g., a digital signal processor (DSP)), a microcontroller, a programmable gate array, etc. The processor 903 may be referred to as a central processing unit (CPU). Although just a single processor 903 is shown in the wireless communication device 902 of FIG. 9, in an alternative configuration, a combination of processors (e.g., an ARM and DSP) could be used.

The wireless communication device 902 also includes memory 905. The memory 905 may be any electronic component capable of storing electronic information. The memory 905 may be embodied as random access memory (RAM), read-only memory (ROM), magnetic disk storage media, optical storage media, flash memory devices in RAM, on-board memory included with the processor, erasable programmable read-only memory (EPROM), electrically erasable programmable read-only memory (EEPROM), registers and so forth, including combinations thereof.

Data 909a and instructions 907a may be stored in the memory 905. The instructions 907a may be executable by the processor 903 to implement the methods disclosed herein. Executing the instructions 907a may involve the use of the data 909a that is stored in the memory 905. When the processor 903 executes the instructions 907, various portions of the instructions 907b may be loaded onto the processor 903, and various pieces of data 909b may be loaded onto the processor 903.

The wireless communication device 902 may also include a transmitter 911 and a receiver 913 to allow transmission and reception of signals to and from the wireless communication device 902 via an antenna 917. The transmitter 911 and receiver 913 may be collectively referred to as a transceiver 915. The wireless communication device 902 may also include (not shown) multiple transmitters, multiple antennas, multiple receivers and/or multiple transceivers.

The wireless communication device 902 may include a digital signal processor (DSP) 921. The wireless communication device 902 may also include a communications interface 923. The communications interface 923 may allow a user to interact with the wireless communication device 902.

The various components of the wireless communication device 902 may be coupled together by one or more buses, which may include a power bus, a control signal bus, a status signal bus, a data bus, etc. For the sake of clarity, the various buses are illustrated in FIG. 9 as a bus system 919.

Figure 10:
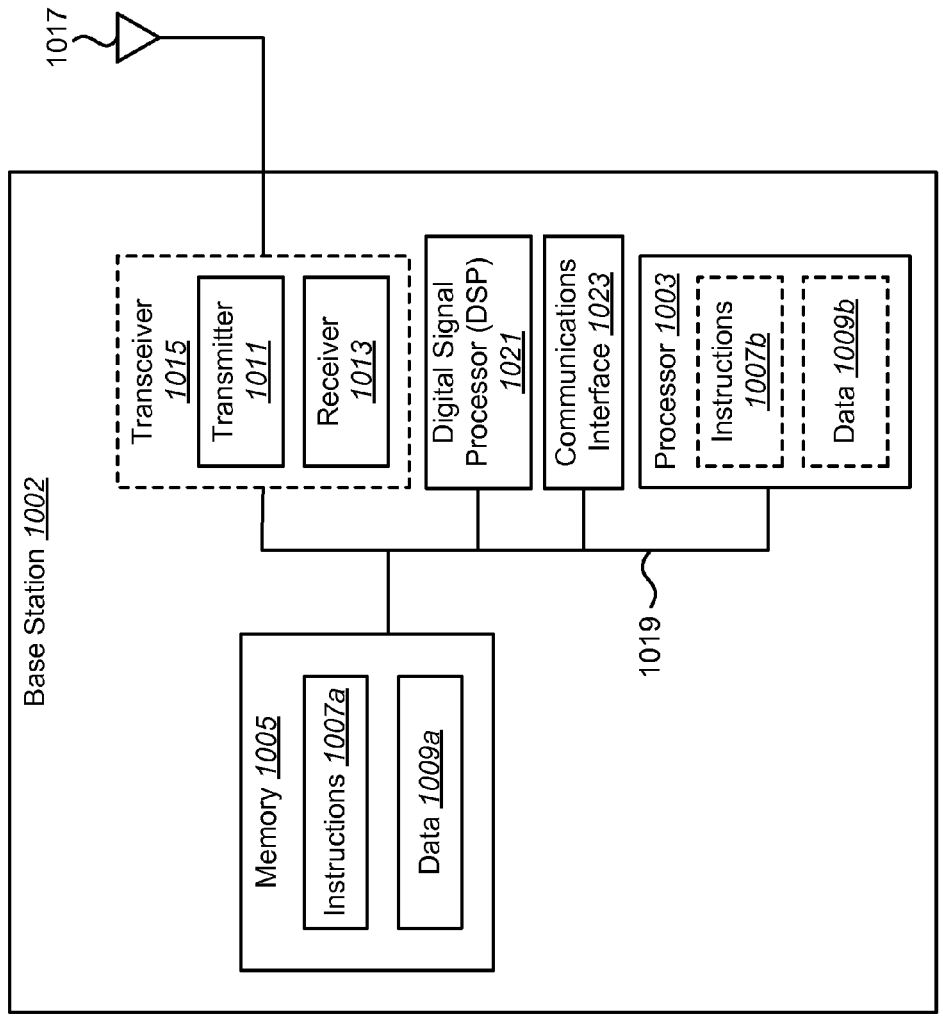
FIG. 10 illustrates certain components that may be included within a base station.

FIG. 10 illustrates certain components that may be included within a base station 1002. A base station may also be referred to as, and may include some or all of the functionality of, an access point, a broadcast transmitter, a NodeB, an evolved NodeB, etc. The base station 1002 includes a processor 1003. The processor 1003 may be a general purpose single- or multi-chip microprocessor (e.g., an ARM), a special purpose microprocessor (e.g., a digital signal processor (DSP)), a microcontroller, a programmable gate array, etc. The processor 1003 may be referred to as a central processing unit (CPU). Although just a single processor 1003 is shown in the base station 1002 of FIG. 10, in an alternative configuration, a combination of processors (e.g., an ARM and DSP) could be used.

The base station 1002 also includes memory 1005. The memory 1005 may be any electronic component capable of storing electronic information. The memory 1005 may be embodied as random access memory (RAM), read only memory (ROM), magnetic disk storage media, optical storage media, flash memory devices in RAM, on-board memory included with the processor, EPROM memory, EEPROM memory, registers, and so forth, including combinations thereof.

Data 1009a and instructions 1007a may be stored in the memory 1005. The instructions 1007a may be executable by the processor 1003 to implement the methods disclosed herein. Executing the instructions 1007a may involve the use of the data 1009a that is stored in the memory 1005. When the processor 1003 executes the instructions 1007a, various portions of the instructions 1007b may be loaded onto the processor 1003, and various pieces of data 1009b may be loaded onto the processor 1003.

The base station 1002 may also include a transmitter 1011 and a receiver 1013 to allow transmission and reception of signals to and from the base station 1002. The transmitter 1011 and receiver 1013 may be collectively referred to as a transceiver 1015. An antenna 1017 may be electrically coupled to the transceiver 1015. The base station 1002 may also include (not shown) multiple transmitters, multiple receivers, multiple transceivers and/or multiple antennas.

The base station 1002 may include a digital signal processor (DSP) 1021. The base station 1002 may also include a communications interface 1023. The communications interface 1023 may allow a user to interact with the base station 1002.

The various components of the base station 1002 may be coupled together by one or more buses, which may include a power bus, a control signal bus, a status signal bus, a data bus, etc. For the sake of clarity, the various buses are illustrated in FIG. 10 as a bus system 1019.

The techniques described herein may be used for various communication systems, including communication systems that are based on an orthogonal multiplexing scheme. Examples of such communication systems include orthogonal frequency division multiple access (OFDMA) systems, single-carrier frequency division multiple access (SC-FDMA) systems and so forth. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may comprise a single computer-readable statement or many computer-readable statements.

The functions described herein may be implemented in software or firmware being executed by hardware. The functions may be stored as one or more instructions on a computer-readable medium. The terms "computer-readable medium" or "computer-program product" refers to any tangible storage medium that can be accessed by a computer or a processor. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers. It should be noted that a computer-readable medium may be tangible and non-transitory. The term "computer-program product" refers to a computing device or processor in combination with code or instructions (e.g., a "program") that may be executed, processed or computed by the computing device or processor. As used herein, the term "code" may refer to software, instructions, code or data that is/are executable by a computing device or processor.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio and microwave, then the coaxial cable, fiber optic cable, twisted pair, DSL, or wireless technologies such as infrared, radio and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

Further, it should be appreciated that modules and/or other appropriate means for performing the methods and techniques described herein, such as those illustrated by FIG. 2 and FIG. 6, can be downloaded and/or otherwise obtained by a device. For example, a device may be coupled to a server to facilitate the transfer of means for performing the methods described herein. Alternatively, various methods described herein can be provided via a storage means (e.g., random access memory (RAM), read-only memory (ROM), a physical storage medium such as a compact disc (CD) or floppy disk, etc.), such that a device may obtain the various methods upon coupling or providing the storage means to the device.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A wireless device, comprising:
   an antenna;
   a hybrid transformer; and
   a frequency matching termination port, wherein the frequency matching termination port provides impedance matching with the antenna at multiple frequencies.

2. The wireless device of claim 1, wherein the frequency matching termination port comprises multiple resistors, inductors and capacitors that can be switched in/out.

3. The wireless device of claim 2, wherein the frequency matching termination port mimics an impedance of the antenna over a broad range of frequencies.

4. The wireless device of claim 1, wherein the wireless device is a wireless communication device.

5. The wireless device of claim 1, wherein the wireless device is a base station.

6. The wireless device of claim 1, wherein the frequency matching termination port is controlled by a frequency impedance adjusting module.

7. The wireless device of claim 6, wherein the frequency impedance adjusting module continuously tunes the frequency matching termination port to match the antenna impedance at the multiple frequencies.

8. The wireless device of claim 6, wherein the frequency impedance adjusting module continuously tunes the frequency matching termination port to match the antenna impedance at a single frequency for wideband termination in full duplex systems.

9. The wireless device of claim 6, wherein the frequency impedance adjusting module periodically tunes the frequency matching termination port to match antenna impedance at the multiple frequencies.

10. The wireless device of claim 6, wherein the frequency impedance adjusting module periodically tunes the frequency matching termination port to match antenna impedance at a single frequency for wideband termination in full duplex systems.

11. The wireless device of claim 6, wherein the frequency impedance adjusting module tunes the frequency matching termination port to match an impedance of an antenna trajectory at selected frequencies.

12. The wireless device of claim 1, further comprising a transmitter and a receiver connected to the antenna via the hybrid transformer.

13. The wireless device of claim 1, wherein the frequency matching termination port provides impedance matching with the antenna at multiple discrete matching frequencies determined by the wireless device.

14. A method for impedance matching at multiple discrete matching frequencies, comprising:
    determining multiple discrete matching frequencies for frequency matching; and
    adjusting a frequency matching termination port to obtain impedance matching with an antenna for a hybrid transformer at the multiple discrete matching frequencies.

15. The method of claim 14, further comprising transmitting/receiving using the hybrid transformer and the antenna.

16. The method of claim 14, wherein determining multiple discrete matching frequencies comprises:
    determining a number of discrete matching frequencies at which to match an impedance of the frequency matching termination port to an impedance of the antenna; and
    selecting the discrete matching frequencies.

17. The method of claim 16, wherein adjusting a frequency matching termination port comprises:
    obtaining an antenna trajectory for the antenna; and
    adjusting the frequency matching termination port to match an impedance of the antenna trajectory at the selected discrete matching frequencies.

18. The method of claim 14, wherein the frequency matching termination port comprises multiple resistors, inductors and capacitors that can be switched in/out.

19. The method of claim 18, wherein the frequency matching termination port mimics an impedance of the antenna over a broad range of frequencies.

20. The method of claim 14, wherein the method is performed by a base station.

21. The method of claim 14, wherein the method is performed by a wireless communication device.

22. The method of claim 14, wherein a frequency impedance adjusting module continuously tunes the frequency matching termination port to match the antenna impedance at the multiple discrete matching frequencies.

23. An apparatus for impedance matching at multiple discrete matching frequencies, comprising:
    means for determining multiple discrete matching frequencies for frequency matching; and
    means for adjusting a frequency matching termination port to obtain impedance matching with an antenna for a hybrid transformer at the multiple discrete matching frequencies.

24. The apparatus of claim 23, further comprising means for transmitting/receiving using the hybrid transformer and the antenna.

25. The apparatus of claim 23, wherein the means for determining multiple discrete matching frequencies comprise:
    means for determining a number of discrete matching frequencies at which to match an impedance of the frequency matching termination port to an impedance of the antenna; and
    means for selecting the discrete matching frequencies.

26. The apparatus of claim 25, wherein the means for adjusting a frequency matching termination port comprise:
    means for obtaining an antenna trajectory for the antenna; and
    means for adjusting the frequency matching termination port to match an impedance of the antenna trajectory at the selected discrete matching frequencies.

27. A non-transitory computer-readable medium having instructions thereon, the instructions comprising:
    code for causing a wireless device to determine multiple discrete matching frequencies for frequency matching; and
    code for causing the wireless device to adjust a frequency matching termination port to obtain impedance matching with an antenna for a hybrid transformer at the multiple discrete matching frequencies.

28. The computer-readable medium of claim 27, further comprising code for causing the wireless device to transmit/receive using the hybrid transformer and the antenna.

29. The computer-readable medium of claim 27, wherein the code for causing the wireless device to determine multiple discrete matching frequencies comprises:
    code for causing the wireless device to determine a number of discrete matching frequencies at which to match an impedance of the frequency matching termination port to an impedance of the antenna; and
    code for causing the wireless device to select the discrete matching frequencies.

30. The computer-readable medium of claim 29, wherein the code for causing the wireless device to adjust a frequency matching termination port comprises:
    code for causing the wireless device to obtain an antenna trajectory for the antenna; and
    code for causing the wireless device to adjust the frequency matching termination port to match an impedance of the antenna trajectory at the selected discrete matching frequencies.

* * * * *